G. P. HOPKINS.
Cooking Stove.
No. 3,289.
Reissued Feb. 9, 1869.
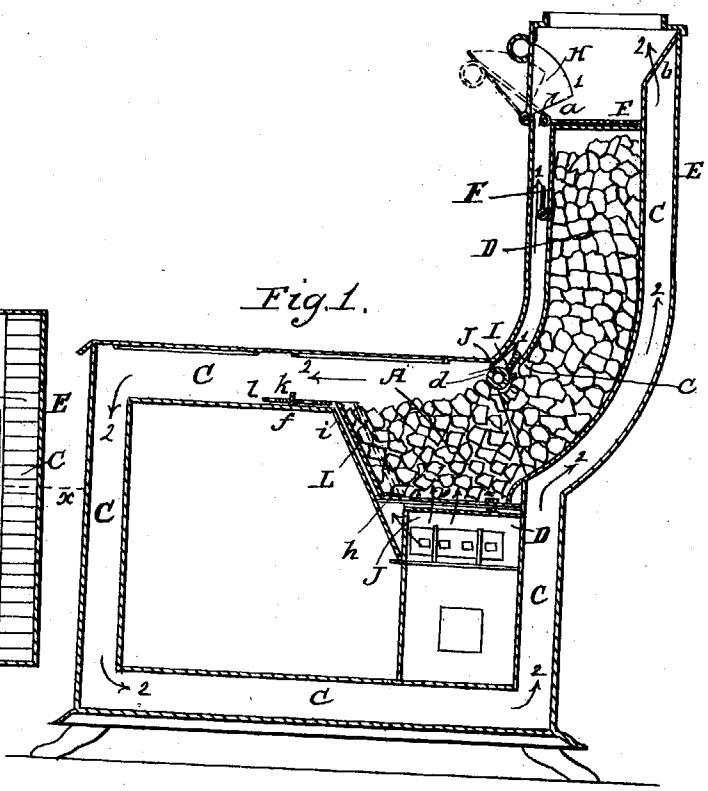
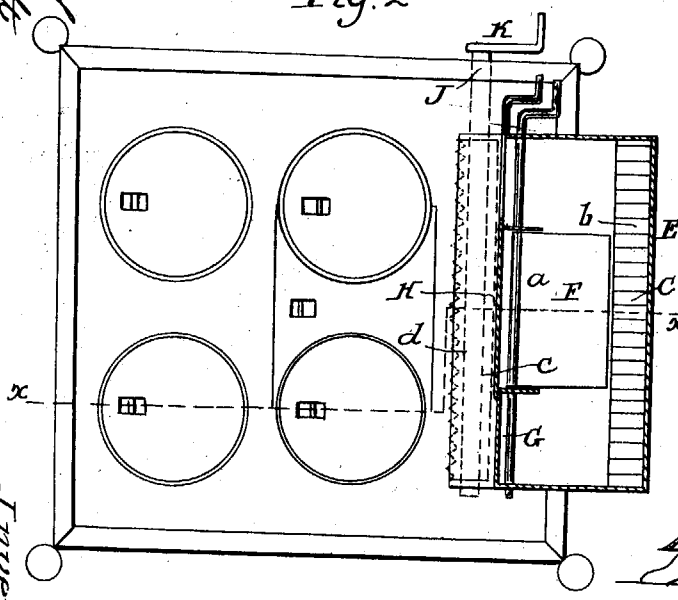
Witnesses:
Geo W. Hopkins
John A. Draught.
Inventor:
Geo P. Hopkins.
N. PETERS, Photo-Lithographer, Washington, D. C.

UNITED STATES PATENT OFFICE.

GEORGE P. HOPKINS, OF ALBION, NEW YORK.

COOKING-STOVE.

Specification forming part of Letters Patent No. 38,744, dated June 2, 1863; Reissue No. 3,289, dated February 9, 1869.

*To all whom it may concern:*

Be it known that I, GEORGE P. HOPKINS, of Albion, in the county of Orleans and State of New York, have invented a new and Improved Cook-Stove; and I do hereby declare that the following is a full, clear, and exact description of the same, reference being had to the accompanying drawings, making a part of this specification, in which—

Figure 1 is a side sectional view of my invention, taken in the line *x x*, Fig. 2. Fig. 2 is a plan or top view of the same, the top plate of the case, which contains the flues, being removed.

Similar letters of reference indicate corresponding parts in the two figures.

The nature of my invention consists in providing a magazine or receptacle for coal, other than the fire pot or chamber, which shall contain sufficient unignited coal to supply the fire for a considerable time, to be applied to cooking-stoves in such a manner as to feed the coal obliquely from one side, so as to afford an unobstructed space above the fire, so that vessels may be placed directly over it. I also provide a suitable means of throwing the coal from the magazine into the fire-pot, and also of supplying the gases evolved from the burning fuel with air to complete combustion; and, further, my invention provides a means of enlarging or contracting the fire-pot at will.

To enable those skilled in the art to fully understand and construct my invention, I will proceed to describe it.

A represents the fire-chamber of the stove; B the oven, and C the flue, extending all around it, as shown clearly in Fig. 1. D is a magazine or coal-receptacle, which is fitted in an upright case, E, opening into the fire-chamber A obliquely, so that a line drawn across the mouth of the magazine would be about parallel with the back of the fire-chamber A, and is provided at the upper end with a lid, F, connected at one end by a hinge or joint, *a*. The flue C extends upward behind the magazine D, and in front of the magazine there is a flue, G, which communicates with the flue C, just above the fire-chamber A. The upper end of the flue C is provided with a grating, *b*, which prevents coal from passing into it when the magazine is filled. H is a door, which may be placed on either side of the upper end of the case E, and through which the magazine is supplied with coal. When the door H is opened for this purpose the lid F is raised, forming an inclined plane to conduct the coal into the magazine D. (See Fig. 1.) The flue G is provided with a damper, I, near its lower end, and in the lower part of said flue, just below the damper I, there is a tubular shaft, J, which communicates with the external air at one end, and is provided with a crank, K. This shaft J has a flange or wing, *c*, attached to it, extending the whole length, and it also has a serrated or toothed plate, *d*, attached to it at a point directly opposite to the wing *c*; and the shaft is perforated with small holes, which may pass through the teeth of plate *d*, or just above or below it. A supplemental damper, I′, is also placed in the flue G. L is the back of the fire-chamber A, which is made separately or detached from the other parts of the stove, and is arranged in such a manner that it may slide or be adjusted in the stove.

By referring to Fig. 1 it will be seen that the upper end of the back L of the fire-chamber A is provided with a horizontal plate, *f*, which rests on the top of the oven B, and the lower part of the fire-chamber, in which the grate *g* is fitted, rests on supports *h*. By this arrangement the back L of the fire-chamber A may be adjusted more or less forward or backward, and its capacity varied materially. The plate *f* is perforated with holes *i* to admit air into the upper part of the fire-chamber from the ash-pit *j* below. Air is also admitted into the upper part of the fire-chamber through the perforations in the tubular shaft J, (see arrows,) and this shaft, when rotated, serves as a means to adjust or feed the coal from the magazine D into the fire-chamber, as the shaft J is at the upper part of the lower end of the magazine.

When the damper I is open the products of combustion pass directly up the flue G, as indicated by the arrows 1, and when said damper is closed they pass around the oven B, as indicated by the arrows 2.

I would remark that the back L of the fire-chamber A may be retained at any desired point by a pin, *k*, at the top of the oven, which may be fitted in any of a series of holes, *l*, in the plate *f*.

The lower parts of the magazine D and flue G are curved, as shown in Fig. 1, so that they may have a proper relative position with the fire-chamber A, and admit of the latter being properly supplied with fuel from one side in such a way as to have one, two, or more griddle-holes directly over the body of the fire in the chamber A, and at the same time admit of a proper draft being afforded it.

Having thus described my invention, what I claim as new, and desire to secure by Letters Patent, is—

1. The magazine D, in combination with the flues C and G and fire-chamber A, substantially as shown and described.

2. The curvature of the magazine D and the flues C and G, as herein set forth.

3. The tubular perforated shaft J, fitted in the lower part of the flue G, and provided with the wing *c* and serrated plate *d*, and placed in such position relatively with the fire-chamber A and magazine D to operate as and for the purpose specified.

4. The sliding or adjustable back L of the fire-chamber A, arranged as shown, when arranged and combined with the flues C G, perforated shaft J, and the magazine D, as herein set forth.

GEO. P. HOPKINS.

Witnesses:
GEO. M. HOPKINS,
JOHN A. STRAIGHT.